March 31, 1936. H. G. C. HINGST 2,035,809
SHOCK ABSORBING DEVICE FOR MOTOR VEHICLES
Filed July 5, 1935
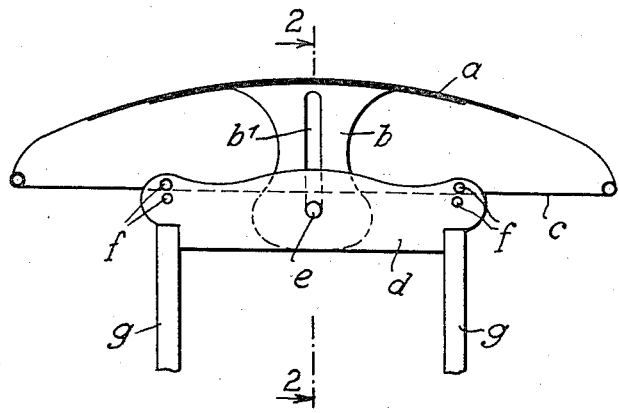
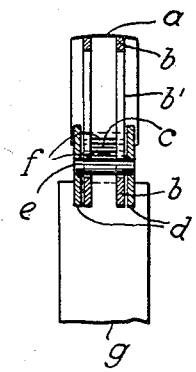

Patented Mar. 31, 1936

2,035,809

UNITED STATES PATENT OFFICE 2,035,809

SHOCK ABSORBING DEVICE FOR MOTOR VEHICLES

Hermann Gustav Christian Hingst, Hamburg, Germany

Application July 5, 1935, Serial No. 29,962
In Germany March 2, 1934

1 Claim. (Cl. 293—55)

I have filed an application in Germany, March 2, 1934.

This invention relates to a shock absorbing device for motor vehicles, the blade springs or rigid bumping rods being attached to an oscillatable, rearwardly shiftable carrier which may be rigid, resilient or provided with blade springs.

Many of the shock absorbing devices generally known as "bumpers" are not sufficiently resilient when strongly stressed. They very often do not yield sufficiently; there exist, however, also devices which on the contrary yield too easily on impact and in both instances the occupants of the vehicle and the vehicle itself are endangered.

The invention relates to a device which operates in such a manner that it gradually loses its strength irrespective of the place where the impact occurs or the direction thereof. This effect is due chiefly to the employment of the principle of cross-bow and string.

The novelty of the invention consists in that the shock absorber arranged transversely on the vehicle is provided with a carrier connected with the vehicle in a peculiar manner and that its ends are connected by flexible tension elements.

It is likewise possible to make the shock absorber and carrier in one piece, so that the carrier is at the same time the shock absorber, and only a small piece of steel remains in the middle which bridges the lateral bows formed by the carrier.

An embodiment of the invention is illustrated by way of example in the accompanying drawing in which:—

Fig. 1 shows the device in top plan view partly in horizontal section.

Fig. 2 is a section on line II—II of Fig. 1.

A blade spring $a$ serving as shock absorber is reinforced in its middle portion and bent towards the rear in such a manner that with a tension element $c$ connecting its ends it represents a strong bent crossbar possessing considerable intrinsic resilient strength.

A carrier $b$, on which the shock absorber $a$ is mounted, consists of two steel plates arranged one above the other. The space between these plates corresponds to the width or height of the flexible tension element $c$ which extends between the two carrier plates and in the example shown consists for example of a steel band of slight thickness but great strength.

The carrier plates $b$ have at the middle a longitudinal slot $b1$.

A carrier support $d$ likewise composed of two horizontal steel plates arranged one above the other is fixed on the chassis $g$, and between the plates the carrier $b$ is mounted so that it can oscillate in lateral directions and slide towards the rear.

The two plates $d$ of the carrier support may be covered on their inner side with an elastic material, such as soft wood, rubber, pressed cork or the like, or the carrier $b$ may be provided at its rear end with such a padding.

Two vertical steel bolts $f$ are arranged at each end at the front of the carrier support $d$ and the tension element $c$ extends between these bolts so that it is bent at these two points under any impact and consequently bends the blade spring $a$.

An axle $e$ consisting of a steel bolt extends vertically through the carrier support $d$ and the guide slots $b1$ in the carrier plates $b$ and enables the device to swing in lateral direction and to slide backwards as far as the slots $b1$ allow, whereas it prevents a lateral displacement of the device.

It is also pointed out that impacts which do not occur at right angles to the vehicle but which are by no means seldom and which are often serious lose their effect, owing to the peculiar manner of mounting the device, because, with the exception of the support which is scarcely affected by the impact, there are no parts which are rigidly mounted and liable to fracture or bending, the shock absorber, carrier and tension element forming a resilient body which yields under any impact in increasing its intrinsic resistance to spring back automatically into its position of rest.

If desired, the effect of the device can be increased by fitting for example rubber pads on the rear end of the carrier which pads, as the carrier moves towards the rear, but against a rod or the like fixed on the ends of the chassis behind the carrier and thus produce a second shock absorbing.

I claim:—

A shock absorbing device for motor vehicles, comprising in combination a carrier having a longitudinal slot oscillatably and slidably mounted at the front end of the vehicle, a carrier support fixed on the chassis of the vehicle, a vertical bolt in the carrier support extending through said slot of said carrier, blade springs on the front of said carrier, bent towards the rear, and a flexible tension element connecting the ends of said bent blade springs and guided on said carrier support.

HERMANN GUSTAV CHRISTIAN HINGST.